Patented Sept. 19, 1939

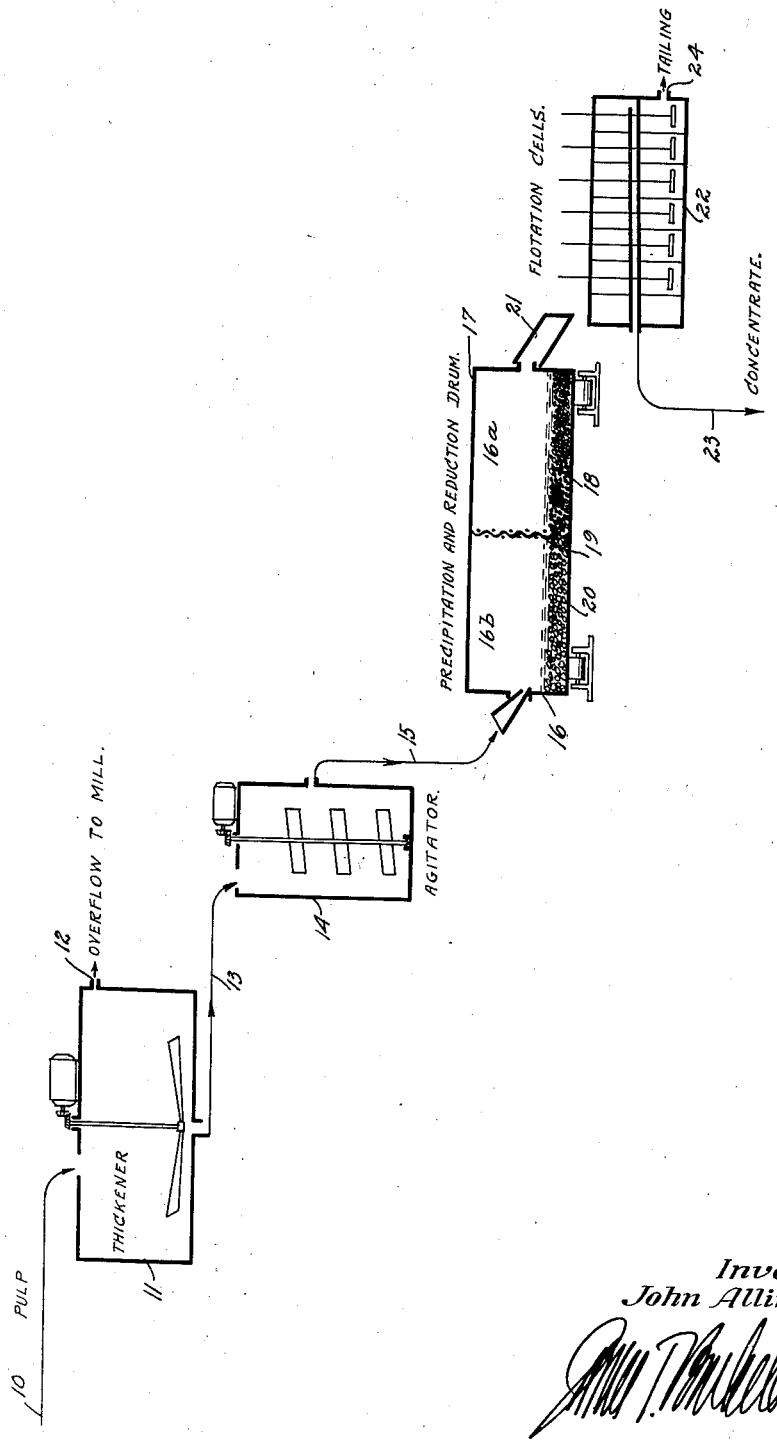

2,173,090

UNITED STATES PATENT OFFICE 2,173,090

PROCESS FOR THE TREATMENT OF ORES AND TAILINGS

John Allingham, Los Angeles, Calif., assignor of one-half to William N. Rossberg, Los Angeles, Calif.

Application October 6, 1937, Serial No. 167,576

19 Claims. (Cl. 75—1)

This invention has to do generally with an improved process for the treatment of precious metal ores (inclusive of tailings or slimes) and especially those which are difficult or impracticable to treat by previously known processes because of the condition in which the metal exists in the ore, or because of the sliminess of the ore which makes the ore difficult to treat by processes requiring filtration or settlement to separate the liquids from the solids. I refer particularly to oxidized ores containing gold or silver, or both, which are difficult to treat by the usual flotation processes, or ores requiring expensive treatment by flotation and/or cyanidation, and also those ores which cannot satisfactorily be treated by either or both flotation and cyanidation, or ores which cannot satisfactorily be treated by known hydrometallurgical processes.

Types of gold or silver ores which the present process is especially adapted to treat include oxidized ores that may contain other metals (or their compounds) such as copper, lead, zinc, manganese and mercury. The following may be cited as typical: (a) Oxidized copper ores containing gold and silver, which cannot readily be treated by flotation, and which from a practical standpoint cannot be cyanided because of the high cyanide consumption. In some cases even cyanidation will not give a good recovery of the gold or silver until the copper has been broken up or dissolved. (b) Oxidized ores containing silver and gold, but no copper, and perhaps other oxidized metals such as lead and/or zinc. These ores cannot satisfactorily be treated by flotation. (c) Oxidized ores containing lead together with silver. (d) Semi-oxidized ores containing metals in sulphide and oxidized form. (e) Ores and tailings containing organic matter. In this group may be included Pan Amalgamation or Patio process tailings which, as known, contain copper and mercury in addition to gold and silver. These tailings may contain copper as oxide and basic sulphate, and mercury, principally as mercurous chloride.

Primarily, the invention is directed to the use of a voltaic couple in the treatment of ore pulps by a method whereby recoveries of gold and silver, from such ores as I have mentioned may be had to better economic advantage than attainable by any other process. A portion of other metals such as copper and mercury when present in the ore may also be recovered.

Precipitation of metals from their ores in the presence of a floatable couple, and the general effect of the couple disclosed in inducing precipitation, are included in the subject matter of United States Letters Patent No. 2,079,597, granted May 11, 1937, on Method and means for the recovery of precious metals. It will suffice to note with reference to the patented process that the disclosure there is directed to the use of a couple comprising carbonaceous-metal particles upon which the metal to be recovered is precipitated, and which are floated, together with the precipitate, to the final recovery stages. The present invention differs from the patented process fundamentally with respect to the type and character of the voltaic couple used, and certain operating conditions that make the couple of the present invention highly efficient as a means of recovering precious metals from ores of the class mentioned hereinabove.

In accordance with the invention I subject the pulp to the action of a voltaic couple, the general function of which is two-fold: first, to induce and facilitate reduction and/or precipitation of the metal to be recovered, and second, to place that metal in a condition such that it may readily be recovered, as by flotation. The couple comprises a combination of materials, one of which is a metal or a metal compound that is particularly selected as a reducing agent for the compound or compounds of the metal to be recovered, and the other of which is a different material, preferably a metal, which together with the reducing metal, or its compound, forms a couple. The most efficient combination of the couple metals in any given instance will of course depend upon the ore being treated, and perhaps the condition and composition of the pulp. Generally speaking, in the treatment of all the types of ores mentioned, the couple may consist of or include separate but contacting materials in combinations such as the following, given as examples of the cheaper combinations: Iron-zinc, iron-copper, iron-aluminum, zinc-copper, silicon carbide-iron, silicon carbide-copper, and silicon carbide-zinc. For greatest efficiencies and highest recoveries, I prefer to use such metal combinations as iron-zinc or copper-zinc.

Ordinarily, the pulp to be treated will be given electrolytic properties by the addition of a suitable acid or alkali, preferably in sufficient quantity to make the pulp definitely acid or alkaline, where the pulp initially is not sufficiently acid or alkaline to possess the desired electrolytic properties. It is not necessary that the metals to be recovered be dissolved in the usual cyanide, hypo or thiosulphate solvents, in order for the couple to be effective to give high recoveries, although it will be understood that if for any reason it is found desirable to do so, any suitable solvent of that type may be used in the pulp. In the treatment of some ores, it has been found that the addition of a small amount of cyanide, hypo or thiosulphate to the pulp materially increases the recovery. But in general, the pulp need comprise only the ore or tailings reduced to sufficient fineness for efficient extraction of the metal, together with sufficient water to render the pulp freely flowable, say one part of solids to one and one-half parts of water, and a suitable amount of electrolyte. If any solvent is present, less water will of course be required to maintain the desired solid to liquid ratio.

It may be found desirable to include in the couple a metallic sulphide, as in a silicon carbide-iron sulphide combination, for the treatment of certain ores, for example those containing lead compounds, in view of the ability of the sulphide to place the lead in a condition particularly suited to flotation recovery. To illustrate, particles of lead carbonate would thus become filmed with lead sulphide, rendering the particles readily recoverable by flotation.

Typical examples may be given to illustrate the effectiveness of the present form of couple as a reducing and precipitating medium. As indicated, some metallic oxides or salts insoluble in water can be reduced to metal by the couple in the presence of either an acid or alkali. Other insoluble metal salts can be reduced by a couple comprising a metal more positive than the metal contained in the salt, in an acid solution but not in an alkaline solution. Silver chloride is only slowly reduced by zinc in an acid solution, but is comparatively rapidly reduced by a proper metal couple, say iron and zinc, in an acid or alkaline solution. Mercurous chloride is reduced comparatively slowly by iron or zinc in an acid solution but is quickly reduced by the metal couple in an acid or alkaline solution. An alkaline metal salt or a metal salt soluble in an excess of alkali, such as an ammoniacal copper salt with slight excess of free ammonia, is not precipitated by iron or zinc, but is rapidly precipitated by an iron and zinc couple.

It should be mentioned that in the treatment of some pulps, the condition of the metal in the ore and the effect of the couple upon that metal, may not necessarily result in chemical precipitation on the couple as by reduction of compounds of the ore metal by one of the couple metals. While all the theoretical aspects and results of the couple action as yet have not been fully determined, it is realized that the effect of the couple may be to accomplish extraction of some metal from the ore without direct chemical reaction with the couple. For example, the effect on some metallic compounds may be to separate the metal or a compound of the metal from the siliceous gangue and to put the metal or compound in condition for recovery without the metal becoming physically or chemically bonded to the couple metals. However, there may of course be a temporary deposition or contacting of such separated ore metals with the couple, and obviously it is desirable that such metals be removed from the couple for the same general reasons stated above with reference to precipitated and reduced metals. Therefore, it is to be understood that where, in the claims, I refer to the depositing on and separation from the couple of metal or metals, or their compounds, extracted from the ore, this language is to be regarded as definitive also of the condition to which I have just referred, i. e., where a separation of the ore metal occurs, but without chemical precipitation on or physical binding of the metal to the couple.

Additional features of the invention, particularly with reference to the nature and functioning of the couple, can perhaps be explained to best advantage by reference to the accompanying drawing, which shows diagrammatically and in flow sheet form a typical and illustrative system embodying the invention.

Aqueous ground ore pulp, tailings or slime may be introduced via line 10 to a suitable thickener diagrammatically indicated at 11, wherein the pulp is thickened to a suitable solid to water ratio as indicated in the foregoing, the water overflow being taken off through line 12. The thickened pulp may be delivered through line 13 to a suitable agitator 14 wherein acid or alkali may be added to the water and solids for the purpose of conditioning the pulp, and for dissolving the metals or metal compounds when necessary. The pulp then flows through line 15 into a precipitating and reducing chamber 16, containing the voltaic couple, within a suitable apparatus for subjecting the couple metals to a condition of agitation such that the metals are maintained in a state of frictional rubbing contact. Preferably, though not necessarily, I maintain the couple within an elongated cylindric drum 17 that is continuously rotated by suitable means, not shown, at a rate that will keep the metals in a state of agitation and rubbing engagement sufficient to free the precipitate and adhering slime, and maintain the couple in proper activated condition.

Where a single metal, in addition to the couple, is employed to induce precipitation as later discussed, the couple metals 18 may be contained within one section 16a of the drum chamber separated by a partition 19 provided with suitable openings for the flow of pulp from section 16b containing the single metal 20 and into which the pulp first enters. Preferably the couple metals are graded to a size or sizes that will present within the mass a large surface area on the components of the couple, so that the pulp is intimately exposed to the couple action. The grading also is such as to give intimacy, and multiplicity of contact between the metals throughout the mass 18, to insure effective scouring action between the particles and removal of precipitated metal from the reducing component of the couple as rapidly as the precipitate is deposited. At the same time the couple is being continuously activated by the continuous removal of precipitate that would otherwise diminish the couple effect of the contacting metals. The grading of the couple metals will also be such as to provide pieces of the reducing metal of sufficient size to precipitate the metal to be recovered from substantial or large quantities of the ore, without the reducing metal particles becoming entirely dissolved or reduced in size to an extent that will interfere with the proper couple effect or the desired frictional contact between the couple metals. Any suitable amount of the couple materials may be used that will give the desired couple activity in the pulp and life or length of service of the couple materials. The quantity of the couple may vary in individual instances, and generally, it may depend upon such considerations as the quantity and composition of the ore, the rate at which it is being treated, and the size of the couple particles. As typical, the amount, by weight, of the couple may be around 20% of the weight of the ore being treated.

Preferably the couple will consist of separate but contacting pieces of dissimilar metals in such combinations as I have before mentioned.

In laboratory scale operation, couple particles of about 1/16 inch to 1/8 inch in size have given satisfactory results. For economical operations however, various considerations such as economy, desirability for operation over an extended period, and other reasons, point to the advisability of using larger size particles, for example up to a size passing a three inch ring, or larger. In any event, the initial size of the couple particles should not be so small that the particles will be carried out of the precipitating zone in the pulp stream. As a result of the drum rotation, the two metals, graded to sizes that will give the desired intimacy of contact, continuously rub against each other, freeing the metal being precipitated thereon and scouring clean the metal surfaces of the couple to continuously activate the couple. It is believed that the unusual and continued activity of the couple is also due to or enhanced by the repeated and frequent making and breaking of contacts between the particles forming the individual couples, and the resultant creating and disruption of the localized electric fields of the individual couples. In this manner there is continuously being formed within the couple mass, new individual couples with their newly created electromotive fields, and in all an activated electric condition within the mass that energizes its effect and action on the pulp contained metals.

In the treatment of some ores, it may be desirable first to subject the pulp to the precipitating action of a single metal reducing agent 20, such as iron or zinc, which also may be graded to a particle size corresponding substantially to the particle size of the couple metals. The drum rotation thus continually removes precipitate from both the reducing metal mass 20 and from the metals in the couple mass 18. The time interval during which the pulp remains in the precipitation and reduction drum 17 may be determined by various considerations such as the composition of the pulp, the composition and character of the ore metals contained in the pulp, the type and character of precipitating and reducing metals employed, and the degree of metal extraction desired. In tests which have been made, treatment of the pulp within the drum over a period from thirty minutes to one hour were sufficient, although the actual time period may vary in accordance with the conditions of individual treatments. At this point it may be mentioned that where a slime is being treated, it may be desirable to add sufficient sand to increase the abrading and precipitate-freeing action of the metals in the masses 20 and 18 in rubbing against each other.

The pulp, containing precipitated and reduced metal freed from the couple mass 18 and also the precipitated metal freed from the metal 20, if employed, leaves the drum through line 21 and may then be subjected to any suitable treatment for recovery of the precipitated metal. A flotation recovery process ordinarily will be employed to separate the precipitate from the gangue, and in this connection it may be mentioned that flotation recovery is particularly advantageous by reason of the fact that the precipitated, reduced or conditioned metal and sulphides are found to be in a condition that is highly favorable to their recovery by flotation. Thus in the drawing, I show the pulp to be discharged through line 21 to a series of flotation cells, diagrammatically indicated at 22, within which the metals to be recovered are separated and taken off through line 23, and the tailings discharged through line 24.

It will be understood that while in the foregoing description I have referred to certain preferred methods and operations for purposes of explanation, the invention may include various aspects that are not necessarily limited to the particulars described, as will be apparent to those skilled in the art. Accordingly, various changes and modifications may be made without departure from the intended scope of the invention as expressed in the claims.

I claim:

1. The process of recovering metals from a fluid ore pulp, that includes subjecting the pulp in the presence of an electrolyte to the action of a mass of materials forming a voltaic couple and of a size such that the materials are brought into intimate contact within the mass, and thereby depositing valuable mineral particles from the pulp on one of the couple materials, separating said particles from the couple into the fluid pulp and separating the pulp from the couple, and then recovering said particles from the pulp.

2. The process of recovering precious metals from a fluid ore pulp, that includes subjecting the pulp in the presence of an electrolyte to the action of a mass of materials forming a voltaic couple and of a size such that the materials are brought into intimate contact within the mass, and thereby conditioning valuable mineral particles from the pulp for recovery by flotation, separating said particles from the couple into the fluid pulp and separating the pulp from the couple, and then recovering said particles from the pulp by flotation.

3. The process of recovering precious metals from a fluid ore pulp, that includes subjecting the pulp in the presence of an electrolyte to the action of a mass of materials forming a voltaic couple and of a size such that the materials are brought into intimate contact within the mass, and thereby depositing valuable mineral particles from the pulp on one of the couple materials, separating said particles from the couple into the fluid pulp and activating the couple by subjecting said mass of materials to agitation, and then recovering the separated particles.

4. The process of recovering previous metals from a fluid ore pulp, that includes subjecting the pulp in the presence of an electrolyte to the action of a mass of materials forming a voltaic couple and of a size such that the materials are brought into intimate contact within the mass, and thereby conditioning valuable mineral particles in the pulp for recovery by flotation, separating said particles from the couple into the fluid pulp and activating the couple by subjecting said mass of materials to agitation, and then recovering the separated particles from the pulp by flotation.

5. The process of recovering precious metal from a fluid ore pulp, that includes subjecting the pulp in the presence of an electrolyte to the action of a mass of separate but contacting different metals forming a voltaic couple and of a size such that the metals are brought into intimate contact within the mass, and thereby conditioning valuable mineral particles in the pulp for recovery by flotation, activating the couple and separating said particles from the couple into the fluid pulp by subjecting said mass of metals to agitation, and then recovering the separated particles from the pulp by flotation.

6. The process of recovering precious metals from a fluid ore pulp containing the ore metal in solution in the presence of an electrolyte, that includes subjecting the pulp to the action of a mass of separate but contacting different metals forming a voltaic couple and of a size such that the metals are brought into intimate contact within the mass, and thereby depositing valuable mineral particles from the pulp on one of the couple metals, activating the couple and separating said particles from the couple into the fluid pulp by subjecting said mass of metals to agitation, and then recovering the separated particles.

7. The process of recovering precious metals from a fluid ore pulp containing an electrolyte but with a portion of the metal to be recovered undissolved in the pulp, that includes subjecting the pulp to the action of a mass of separate but contacting different metals forming a voltaic couple and of a size such that the metals are brought into intimate contact within the mass, and thereby conditioning valuable mineral particles in the pulp for recovery by flotation, activating the couple and separating said particles from the couple into the fluid pulp by subjecting said mass of metals to agitation, and then recovering the separated particles from the pulp by flotation.

8. The process of recovering precious metals from a fluid ore pulp, that includes subjecting the pulp in the presence of an electrolyte to the action of a mass of separate but contacting different metals, one of which is zinc, forming a voltaic couple and of a size such that the metals are brought into intimate contact within the mass, and thereby conditioning valuable mineral particles in the pulp for recovery by flotation, activating the couple and separating said particles from the couple into the fluid pulp by subjecting said mass of metals to agitation, and then recovering the separated particles from the pulp by flotation.

9. The process of recovering precious metals from a fluid ore pulp, that includes introducing the pulp to a zone containing a mass of separate but contacting different metals forming a voltaic couple and subjecting the pulp together with an electrolyte to the action of said couple, thereby depositing valuable mineral particles in the pulp on one of the couple metals, continuously agitating said mass to keep the couple metals in frictional engagement to free said particles and to activate the couple, removing the pulp and said particles from said zone but leaving the couple metals therein, and then recovering said particles.

10. The process of recovering precious metals from a fluid ore pulp, that includes subjecting the pulp in the presence of an electrolyte to the action of a solid reducing agent to deposit metal on the reducing agent from the pulp, freeing the metal from said agent, then subjecting the pulp, containing said metal, to the action of a mass of materials forming a voltaic couple and thereby conditioning valuable mineral particles in the pulp for recovery by flotation, separating said particles from the couple into the pulp, and then recovering the separated particles by flotation.

11. The process of recovering precious metals from a fluid ore pulp, that includes subjecting the pulp in the presence of an electrolyte to the action of an agitated mass of divided metal reducing agent to deposit metal on the reducing agent from the pulp, freeing the metal from said agent, then subjecting the pulp, containing said metal, to the action of a mass of materials forming a voltaic couple and thereby conditioning valuable mineral particles in the pulp for recovery by flotation, separating said particles from the couple into the pulp, and then recovering the separated particles by flotation.

12. The process of recovering precious metals from a liquid containing such metals, that includes subjecting the liquid in the presence of an electrolyte to the action of a solid reducing agent to deposit metal on the reducing agent from the pulp, freeing the metal from said agent into said liquid, then subjecting the liquid, containing said metal, to the action of a mass of materials forming a voltaic couple and thereby depositing valuable mineral particles from the liquid on one of the couple materials, separating said particles from the couple, and then recovering the separated particles.

13. The process of recovering precious metals from a liquid containing such metals, that includes subjecting the liquid in the presence of an electrolyte to the action of an agitated mass of divided metal reducing agent to deposit metal on the reducing agent from the pulp, freeing the metal from said agent into said liquid, then subjecting the liquid, containing said metal, to the action of a mass of materials forming a voltaic couple and thereby depositing valuable mineral particles from the liquid on one of the couple materials, separating said particles from the couple, and then recovering the separated particles.

14. The process of recovering precious metals from a liquid containing such metals, that includes subjecting the liquid in the presence of an electrolyte to the action of a solid reducing agent to deposit metal on the reducing agent from the pulp, freeing the metal from said agent into said liquid, then subjecting the liquid, containing said metal, to the action of an agitated mass of separate but contacting metals forming a voltaic couple and thereby depositing valuable mineral particles from the liquid on one of the couple materials, separating said particles from the couple, and then recovering the separated particles.

15. The process of recovering precious metals from a liquid containing such metals, that includes subejcting the liquid in the presence of an electrolyte to the action of an agitated mass of divided metal reducing agent to deposit metal on the reducing agent from the pulp, freeing the metal from said agent into said liquid, then subjecting the liquid, containing said metal, to the action of an agitated mass of separate but contacting metals forming a voltaic couple and thereby depositing valuable mineral particles from the pulp on one of the couple metals, separating said particles from the couple, and then recovering the separated particles.

16. The process of recovering a precious metal from a fluid ore pulp containing a compound of that metal, that includes passing the pulp into a zone containing a mass of separate but contacting solid materials, one of which is a selected reducing agent for said metal compound and another of which is a material forming with said reducing agent a voltaic couple, depositing valuable mineral particles from the pulp on said reducing agent in the presence of an electrolyte, agitating said mass to bring said materials into frictional rubbing contact and thereby freeing said particles from said reducing agent and also activating the couple, removing the pulp from said zone but leaving the couple materials therein, and recovering the separated particles.

17. The process of recovering a precious metal from a fluid ore pulp containing a compound of that metal, that includes passing the pulp into a zone containing a mass of separate but contacting solid materials, one of which is a selected reducing agent for said metal compound and another of which is a material forming with said reducing agent a voltaic couple, depositing valuable mineral particles from the pulp on said reducing agent in the presence of an electrolyte, agitating said mass to bring said materials into frictional rubbing contact and thereby freeing said particles from said reducing agent and also activating the couple, removing the pulp from said zone but leaving the couple materials therein, and recovering the separated particles by flotation.

18. The process of recovering a precious metal from a fluid ore pulp containing a compound of that metal, that includes passing the pulp into a zone containing a mass of separate but contacting pieces of metal, one of said metals being a selected reducing agent for said metal compound, and another being a metal forming with said reducing agent a voltaic couple, depositing valuable mineral particles from the pulp on said reducing agent in the presence of an electrolyte, agitating said mass to bring the couple metals into frictional rubbing contact to free said particles from said reducing metal and also to activate the couple, removing the pulp from said zone, and recovering the separated particles by flotation.

19. The process of recovering a precious metal from a fluid ore pulp containing a compound of that metal, that includes passing the pulp into a zone containing a mass of separate but contacting pieces of metal of a size such that the pieces are in intimate contact within said mass, one of said metals being a selected reducing agent for said metal compound, and another being a metal forming with said reducing agent a voltaic couple, depositing valuable mineral particles from the pulp on said reducing agent in the presence of an electrolyte, agitating said mass to bring the couple metals into frictional rubbing contact to free said particles from said reducing metal and also to activate the couple, removing the pulp from said zone, and recovering the separated particles by flotation.

JOHN ALLINGHAM.